D. P. BURDON.
Bake Oven.
No. 22,778. Patented Feb. 1, 1859.
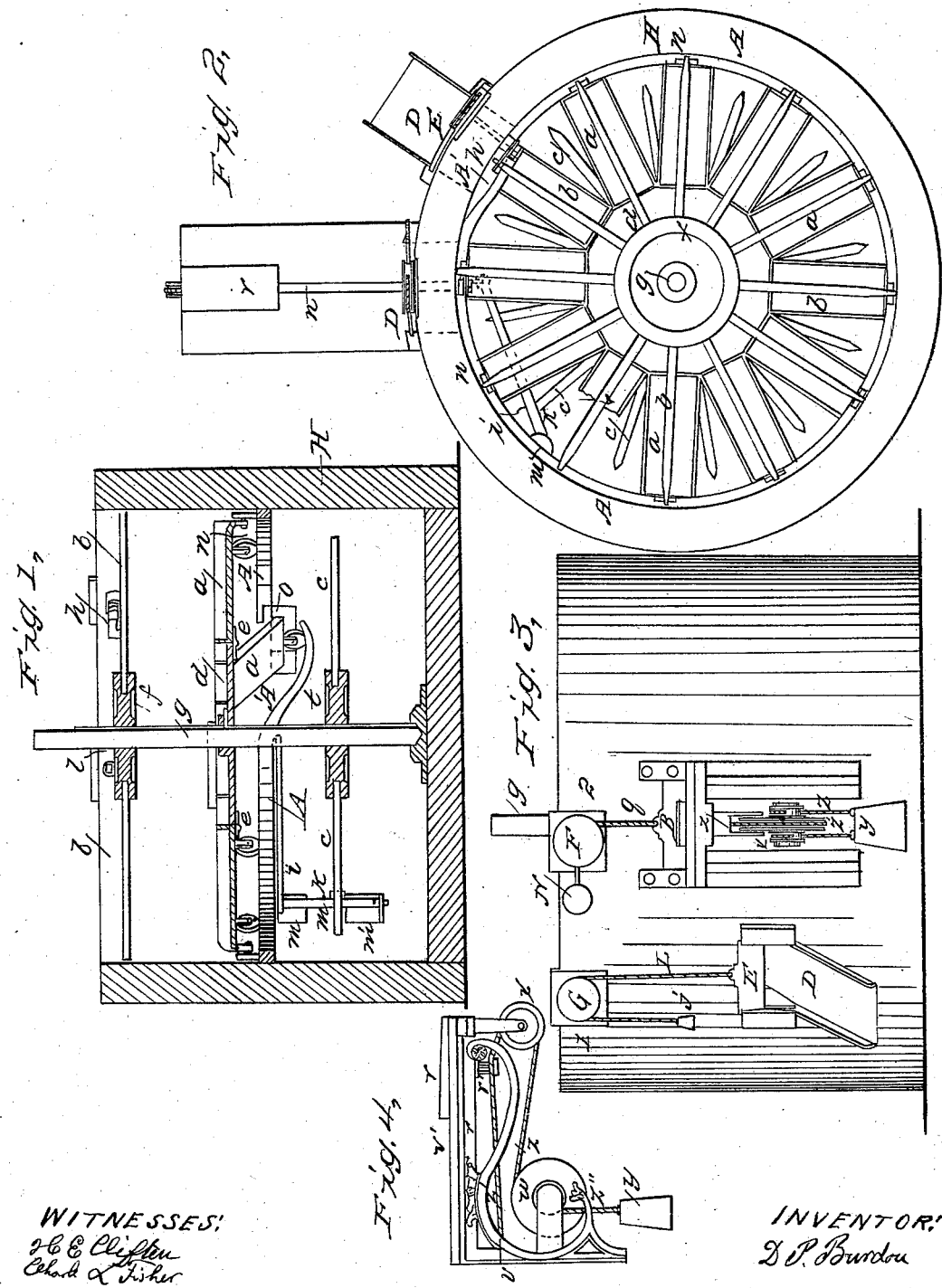
WITNESSES:
INVENTOR:
D. P. Burdon

UNITED STATES PATENT OFFICE.

D. P. BURDON, OF BROOKLYN, NEW YORK.

OVEN.

Specification of Letters Patent No. 22,778, dated February 1, 1859.

*To all whom it may concern:*

Be it known that I, D. P. BURDON, of Brooklyn, in the county of Kings and State of New York, have invented a new and useful Improvement in Machinery for Baking Bread; and I do hereby declare that the following is a full, clear, and exact description thereof, reference being had to the accompanying drawings, and the letters of reference marked thereon, making part of this specification.

Similar letters refer to like parts.

My invention relates, first, to the arrangement, a series of hinged cars upon a rotating disk, in such manner that they may receive unbaked bread and discharge baked bread at the proper places; 2d, combining therewith a circular supporting track, arranged in such manner as to insure sufficient inclination of said cars at the point of delivery, and the restoration, thereof to a level position at the point of reception; 3d, a provision for operating the sliding doors at the points of reception and delivery; 4th, a provision for insuring the introduction of the unbaked bread to the cars within the oven, at the proper time and place.

(Figure 1) is a vertical sectional elevation of the baking machine showing specially the arrangement of the circular track, and inclined position of the hinged car, at the point of delivering the baked bread. (Fig. 2) is a plan of the machine as shown from the top, showing the series of hinged cars, arranged upon the rotating disk and also the provision for operating the sliding doors at the points of reception and delivery. (Fig. 3) represents a front view of the sliding doors, upon the outside of the oven, and also the device for securing the introduction of the unbaked bread to the cars. (Fig. 4) is a side elevation of the device (2) in (Fig. 3) showing the arrangement of the compensating pulleys.

(*a*) is a series of cars hinged to the rotating disk (*d*) at (*e*) in such manner that their outer ends may incline downward when leaving the supporting track (A), as shown in the position (*o*) Fig. 1.

(A) is a circular supporting track, firmly secured to oven shell (H). The portion of the track (A') is formed to receive the cars at the point of delivery (*o*) and restore them as the machine rotates, to a level position at the point of reception.

(*n*) are friction rollers made to rotate upon the track (A) and support the outer ends of the cars (*a*).

(*b*) is a series of radial arms, firmly secured to the disk (*f*) and made to rotate in harmony with the disk (*d*) and cars (*a*) for the purpose of operating the sliding doors (E, B) (Fig. 3), which is accomplished by means of the points of the arms (*b*) coming in contact with the cams (*h*, *l*), thereby causing the pulleys (G, F) to rotate, sufficiently to elevate the sliding doors, which are connected with the pulleys, by cords (L, *q*). When the arms (*b*) have passed from the cams (*h*, *l*) the doors (E, B) will descend to their proper position by their own weight. Thus the door (E) will be opened at the precise moment when the cars (*a*) have reached the point of delivery (*o*), and the door (B) will be opened at the precise moment the cars (*a*) arrive at the point of reception, opposite the door (B).

(*c*) is a series of radial arms securely attached to the disk (*t*) and made to rotate in harmony with the arms (*b*) and cars (*a*), for the purpose of operating the lever (*i*). The lever (*i*) is attached to the shaft (*m*) which is secured to the oven shell (H) by means of the projections (*m'*); the shaft (*m*) is provided with the cam (*k*), so that as the arms (*c*) are made to rotate, and come in contact with the cam (*k*), the end (*i*) of the lever (*i*) will be forced rapidly inward toward the shaft (*g*). To the end (*i'*) of the lever (*i*) is attached a cord (*z'*) which passes through the oven shell to the neck (*r'*) of the traversing follower (*r*) (Fig. 4). The arms (*c*) are so arranged that they reach the cam (*r*) at the same moment, the arms (*b*) reach the cam (*l*) so that, the door (B) (Fig. 3) will be opened and the traversing follower (*r*) by means of the cord (*z'*), lever (*i*), cam (*k*) and arms (*c*) drawn rapidly toward the door (B) at the same time, thus insuring the introduction of the unbaked bread to the cars (*a*) at the proper time.

(*v'*) is a platform arranged upon the frame (*v*) upon which bread pans may be placed previous to their being introduced to the cars (*a*), and is formed with the slot (*u*) in which the neck (*r'*) of the follower (*r*) is made to work.

(*v*) is a frame firmly secured to the oven shell (H).

($w$) is a compensating pulley wheel arranged in the frame ($v$) as represented in (Fig. 4).

($x$) is a pulley wheel, around which the cord ($z$) passes to the neck ($r'$) of the follower ($r$); ($z''$) are cords attached to the smaller circles of the pulley ($w$) and to the weight ($y$). The weight ($y$) is arranged to operate the pulley ($w$) so that, the follower ($r$) will be returned to its outer position the moment it has delivered the bread pans to the cars ($a$).

($g$) is a shaft made to give motion to the machinery working inside the oven shell (H) by means of gear wheels. The motive power may be applied at the bottom, or at the top of the oven, but I prefer it at the top.

What I claim as my invention and desire to secure by Letters Patent is—

1. The arrangement of a series of hinged cars ($a$) around a disk plate ($d$) so that they will deliver, bread pans with their contained bread, at the proper place of discharge, and also receive the said pans, in their revolution substantially in the manner hereinbefore set forth and in combination therewith I claim the circular track (A, A') so arranged, as to support the ends of said cars ($a$) upon friction rollers ($n$) while at the same time allowing each car ($a$) to deposit its pan, at the proper place— and restore said cars ($a$) to their proper position to receive the return pans with their bread, in the manner and for the purposes herein set forth.

2. I claim, operating the sliding doors (E, B) by means of the radial arms ($b$) (or their equivalents) projecting from the driving shaft ($g$) so that the doors (E, B) will be alternately opened and closed at the proper time for delivering the bread, and receiving the bread to be baked.

3. I claim, operating the traversing follower ($r$, $r'$) by means of radial arms ($c$) (or their equivalents) for feeding the pans into the oven, when the same is so arranged that the pans will be fed into the cars ($a$) while the door (B) is open, and in combination therewith I claim the compensating pulley wheel ($w$) and weight ($y$) for equalizing the motion, and returning the traversing follower ($r$, $r'$).

In testimony of which invention I have hereunto set my hand.

D. P. BURDON.

In presence of—
H. E. CLIFTON,
CHARLES L. FISHER.